United States Patent
Waylett

(10) Patent No.: US 10,103,557 B1
(45) Date of Patent: Oct. 16, 2018

(54) RECHARGEABLE BATTERY SYSTEM

(71) Applicant: Tyler Rhys Waylett, Haslet, TX (US)

(72) Inventor: Tyler Rhys Waylett, Haslet, TX (US)

( * ) Notice: Subject to any disclaimer, the term of this patent is extended or adjusted under 35 U.S.C. 154(b) by 0 days.

(21) Appl. No.: 14/958,107

(22) Filed: Dec. 3, 2015

Related U.S. Application Data

(60) Provisional application No. 62/086,931, filed on Dec. 3, 2014.

(51) Int. Cl.
H02J 7/00 (2006.01)

(52) U.S. Cl.
CPC .......... *H02J 7/0044* (2013.01); *H02J 7/0047* (2013.01); *H02J 7/0057* (2013.01); *H02J 2007/0049* (2013.01); *H02J 2007/0062* (2013.01)

(58) Field of Classification Search
CPC .................................................. H02J 7/0044
USPC ....................................................... 320/115
See application file for complete search history.

(56) References Cited

U.S. PATENT DOCUMENTS

| | | | | |
|---|---|---|---|---|
| 8,390,255 | B1 * | 3/2013 | Fathollahi | H02J 7/0045 206/308.3 |
| 2006/0065948 | A1 * | 3/2006 | Yeh | H01F 17/0006 257/531 |
| 2009/0280871 | A1 * | 11/2009 | Hofer | H02J 7/0044 455/573 |
| 2013/0300343 | A1 * | 11/2013 | Files | H02J 7/0055 320/103 |
| 2014/0065948 | A1 * | 3/2014 | Huang | H05K 5/0086 455/7 |
| 2014/0195826 | A1 * | 7/2014 | Wojcik | H05K 5/0086 713/300 |
| 2017/0047753 | A1 * | 2/2017 | Precheur | H02J 7/0044 |

* cited by examiner

Primary Examiner — Suchin Parihar
(74) Attorney, Agent, or Firm — Richard Eldredge; Eldredge Law Firm

(57) ABSTRACT

A combination handheld mobile device and rechargeable battery system. The handheld mobile device being portable and configured to wirelessly communicate with a second mobile device; and the rechargeable battery system operably associated with and configured to provide electrical energy to the handheld mobile device. The rechargeable battery system includes a battery having a body with a partial hollow cavity; a power port conductively coupled to the battery and carried within the partial hollow cavity; and a terminal conductively coupled to the battery and carried on an outside surface of the body.

7 Claims, 3 Drawing Sheets

RECHARGEABLE BATTERY SYSTEM

BACKGROUND

1. Field of the Invention

The present invention relates generally to rechargeable batteries, and more specifically, to handheld radios with rechargeable batteries.

2. Description of Related Art

Handheld radios are well known in the art and are effective means to provide wireless communication. For example, FIG. 1 depicts a simplified communication system 101 having two handheld radios 103, 105 remote from each other and configured to provide communication means between to two or more persons distanced apart from each other. A common disadvantage with radios 103, 105 is the limited duration of use due to the large energy output required to communicate wirelessly. As shown in FIG. 2, a charging station 201 is configured to receive and simultaneously recharge the batteries (not shown) operably associated with radio 103.

A problem associated with charger station 201 is the limited use. For example, the radio 103 is inoperable while attached to station 201, thereby requiring the user to wait until the batteries are charged before reuse. Further, the station 201 is not configured to be portable with the radio 103, for example, the user will typically place station 201 in a location and return the radio 103 to the station 201 during the recharging process.

Although great strides have been made in the area of handheld radios, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
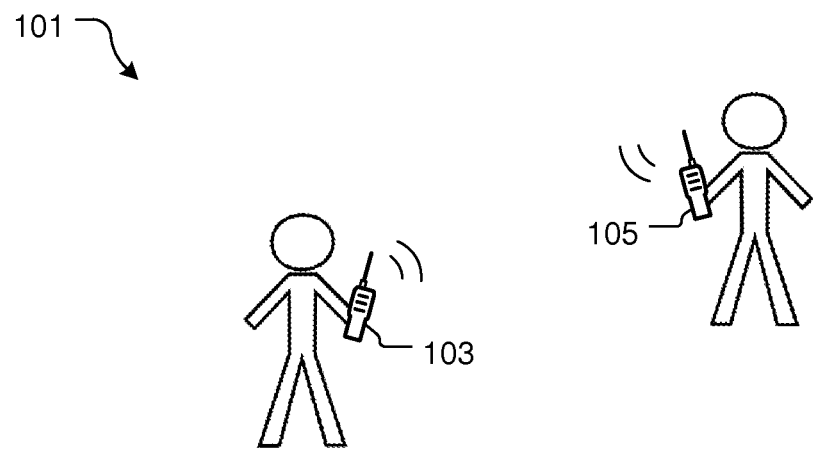
FIG. 1 is a simplified front view of a conventional communication system.
Figure 2:
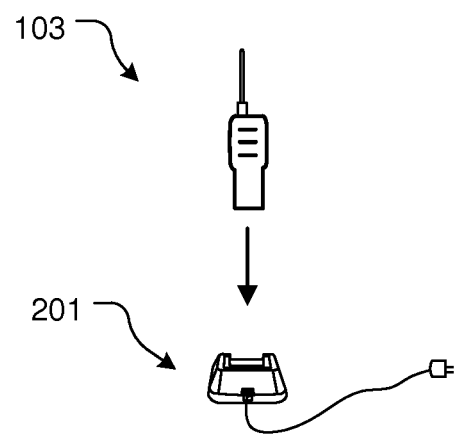
FIG. 2 is a simplified front view of a conventional recharging station for the handheld radio of the communication system of FIG. 1.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional handheld radios. Specifically, the system of the present application is configured to provide rapid and effective means to recharge the batteries via a docketing station or via a port conductively coupled to an external electrical power source. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figures 3, 4:
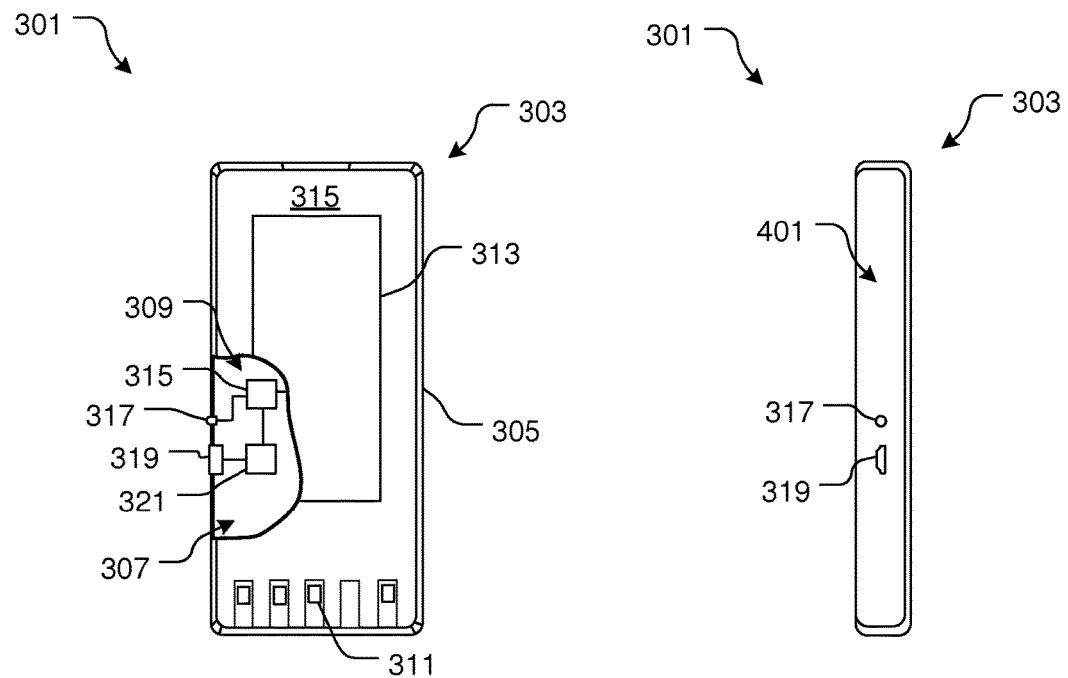
FIG. 3 is a back view of a recharging system for a handheld radio in accordance with a preferred embodiment of the present application.
FIG. 4 is a side view of the system of FIG. 3.

Referring now to the drawings wherein like reference characters identify corresponding or similar elements throughout the several views, FIG. 3 depicts a back view of a rechargeable power system 301 in accordance with a preferred embodiment of the present application. It will be appreciated that the system 301 overcomes one or more of the above-listed problems commonly associated with the conventional battery systems operably associated with handheld radios.

In the contemplated embodiment, system 301 includes one or more of a rechargeable battery 303 configured to securely engage with and power a handheld radio, e.g., radio 505 and/or 603. Battery 303 includes a body 305 forming a cavity 307 that houses the various components of the battery and a control system 309. A plurality of terminals 311 are used to provide means to recharge battery 303 via a docketing station 201. Thus, in the contemplated embodiment, two separate recharging means could be used to recharge battery 303, for example, station 201 via terminals 311 and a power cord 503 via a port 319, as will be discussed below.

In one preferred embodiment, a surface treatment 313 is secured to surface 315 of body 305 to increase frictional gripping between battery 303 and the fingers of the user. The surface treatment 313 could be grooves, etches, and/or material placed on surface 315 such as an elastomeric material. In the exemplary embodiment, the surface treatment 313 is shown in a selected, confined location; however, it will be appreciate that treatment 313 could be positioned on any surface and/or the entire surface area of the battery 303.

Control system 309 is configured to control the electrical energy being channeled to the battery 303 via port 319. In the preferred embodiment, system 309 includes one or more of a processor 315 conductive coupled to a light 317 configured to notify the user when the battery is fully charged, e.g., turning from a red illumination to a green illumination as the battery becomes fully charged. System 309 further includes a transformer 321 and/or other similarly suitable devices configured to convert the correct voltage and amperage to the battery 303 from the external power source (not shown).

As shown in FIG. 4, the port 319 is positioned on a side surface 401 of body 305; however, it is also contemplated positioning the port on any surface of body 305 in alternative embodiments.

Figure 5:
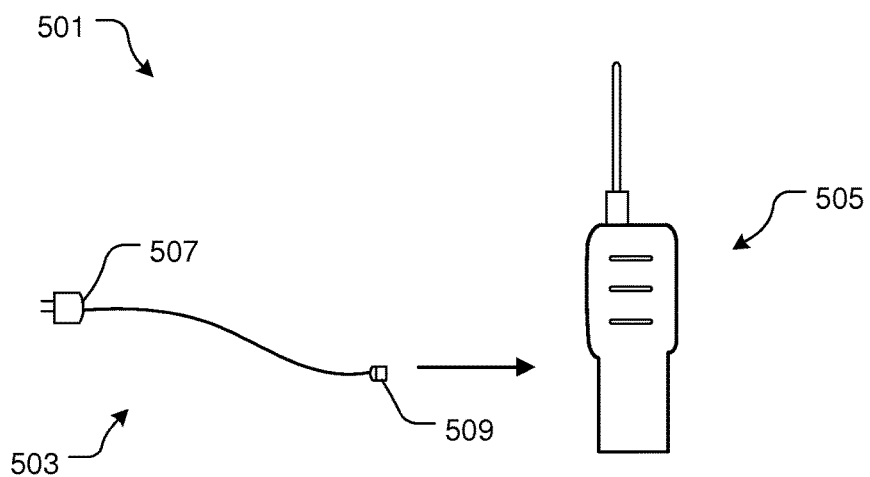
FIG. 5 is a simplified front view of a power cord operably associated with the handheld radio using the recharging system of FIG. 3.

In FIG. 5, a system 501 is shown with a handheld device 505 configured to utilize the features of system 301. It will be appreciated that system 505 is recharged via a cable 503 having an AC plug 507 at one end and a USB plug 509 at the opposing end. Thus, port 319 is configured to receive a USB plug in the contemplated embodiment; however, it will be appreciated that port 319 could be configured to receive power cord receptacles having different shapes and sizes than a USB plug.

Figure 6:
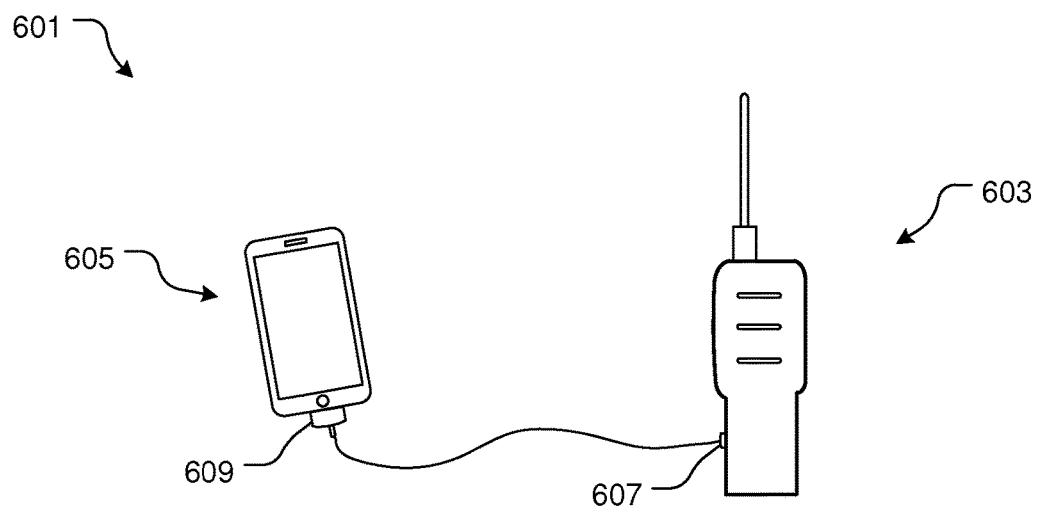
FIG. 6 is a simplified front view of an external device operably associated with the handheld radio using the recharging system of FIG. 3.

Referring now to FIG. 6 in the drawings, an alternative embodiment is shown. In this embodiment, system 601 incorporates one or more of the system features discussed above; however, system 601 is configured with the option of providing electrical energy from the rechargeable battery of handheld radio 603 to an external battery operably associated with a mobile device 605. This feature is achieved via a cable having plugs 607, 609 on opposing ends and configured to secure to receptacles associated with handheld radio 603 and mobile device 605. Thus, in the contemplated embodiment, the handheld radio 603 is configured to recharge the batteries of another mobile device via the rechargeable batteries.

One of the unique features believed characteristic of the present application is the ability to recharge the rechargeable batteries of a handheld radio with a USB power cord, which in turn channels the electrical power from an AC power source, e.g., a wall socket. This feature allows the recharging of the handheld radio at remote location away from the charging station. Thus, the user can now charge from both a recharging station and an AC power supply via the USB cord. It is also contemplated using DC power, e.g., from a car battery, to recharge the handheld radio. The system discussed above facilitates these features.

Figure 7:
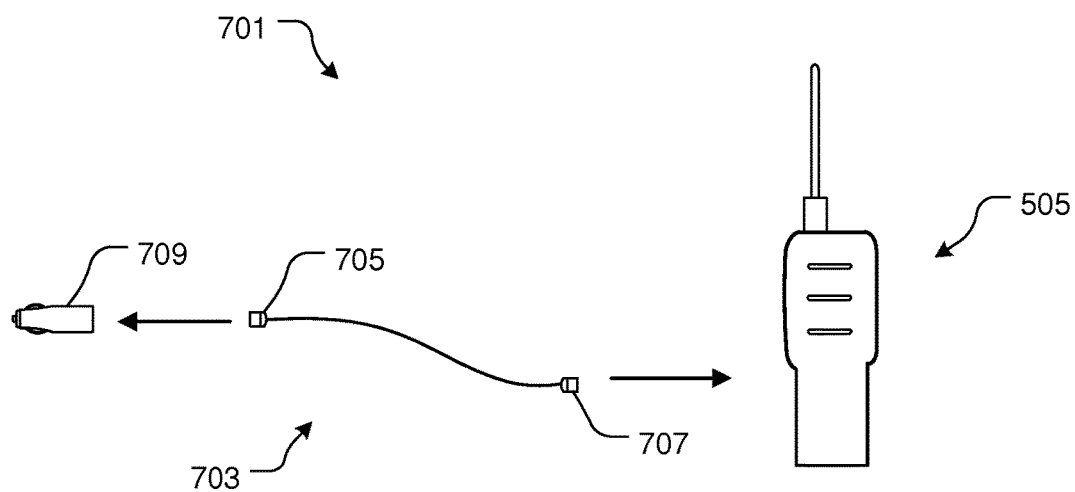
FIG. 7 is a simplified front view of a power cord operably associated with the handheld radio using the recharging system of FIG. 3.

In FIG. 7, a system 701 is shown with a handheld device 505 configured to utilize the features of system 301. It will be appreciated that system 701 is recharged via a cable 703 having a USB plug 705 at one end and a micro USB plug 707 at the opposing end. Thus, port 319 of handheld device 505 is configured to receive the micro USB plug 707, while the USB plug 705 is configured to connect with a car adapter 709. Thus, in the contemplated embodiment, the device 505 is configured to recharge via the car battery.

Another unique feature is the ability to use the handheld device despite having depleted batteries. This feature is achieved by powering the components of the handheld radio directly from an AC or DC power supply via a power cord operably associated with port 319.

Another unique feature is the surface texturing of the body, which in turn creates a gripping surface for better friction. These and other unique features are contemplated in the embodiments discussed above.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A combination handheld mobile radio device and rechargeable battery system, comprising:
   the handheld mobile radio device being portable and configured to wirelessly communicate with a second mobile radio device via a synchronized radio frequency channel; and
   the rechargeable battery system operably associated with and configured to provide electrical energy to the handheld mobile device, the rechargeable battery system having:
   a battery having a body with a partial hollow cavity;
   a signal light associated with the battery;
   a surface treatment secured to a back surface of the body, the surface treatment configured to increase frictional gripping between the body and a user's hand;
   a power port conductively coupled to the battery and carried within the partial hollow cavity; and
   a terminal conductively coupled to the battery and carried on an outside surface of the body;
   wherein the power port is configured to receive a power cord to recharge the battery via an internal charger associated with the power port;
   wherein the terminal is configured to engage with a docking station to recharge the battery; and
   wherein the signal light is configured to provide notice when the battery is charged.

2. The combination of claim 1, further comprising:
a processor conductively coupled to the power port and to the battery, the processor being carried within the partial hollow cavity of the body.

3. The combination of claim 1, further comprising:
a transformer conductively coupled to the power port and to the battery, the transformer being carried within the partial hollow cavity of the body.

4. The combination of claim 1, wherein the power port is a micro USB port.

5. A method to recharge a handheld mobile device, comprising:
   providing the combination of claim 1;
   recharging the battery via the power port with the power cord; and recharging the battery via the terminal with the docking station.

6. The method of claim 5, further comprising:

providing electrical energy to an external power source via the power port.

7. The combination of claim 1, further comprising:

an external cable having a first plug and a second plug;

wherein the first plug is configured to engage with the power port of the rechargeable battery system;

wherein the second plug is configured to engage with a receptacle of a mobile device; and wherein the external cable is configured to direct power from the rechargeable battery system to the mobile device to charge an internal battery of the mobile device via the rechargeable battery system.

* * * * *